No. 857,029. PATENTED JUNE 18, 1907.
B. F. CLEVELAND.
COMBINED CART AND HOG CHUTE.
APPLICATION FILED JULY 12, 1906.

Witnesses
T. P. Britt
E. C. Duffy

Inventor
B. F. Cleveland
By O. E. Duffy & Son
Attorneys

UNITED STATES PATENT OFFICE.

BENJAMIN FRANKLIN CLEVELAND, OF SAC CITY, IOWA.

COMBINED CART AND HOG-CHUTE.

No. 857,029.         Specification of Letters Patent.         Patented June 18, 1907.

Application filed July 12, 1906. Serial No. 325,880.

*To all whom it may concern.*

Be it known that I, BENJAMIN FRANKLIN CLEVELAND, a citizen of the United States, residing at Sac City, in the county of Sac and State of Iowa, have invented certain new and useful Improvements in a Combined Cart and Hog-Chute; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to a combined cart and hog chute, and has for its object to provide a device of this class which can be utilized as a simple cart for ordinary purposes and which can be quickly and easily converted into a hog chute for removing hogs from cars, vehicles, etc.

With this object in view my invention consists in the novel construction of the cart and chute, and also in certain combinations of parts which will be first fully described and afterward specifically pointed out in the appended claims.

Figure 1:
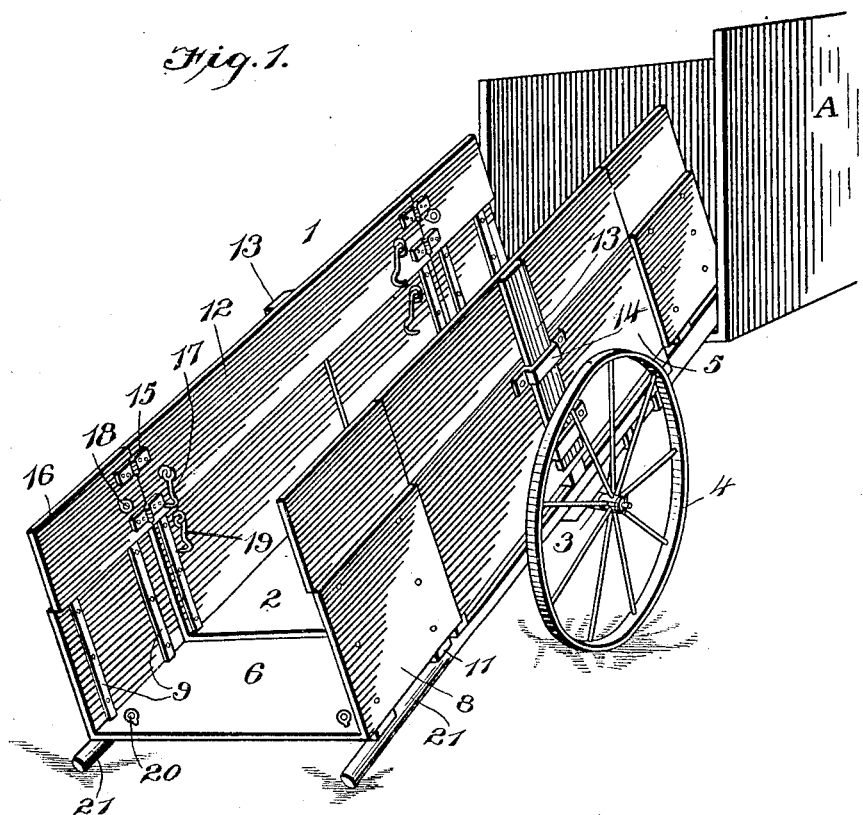
Figure 2:
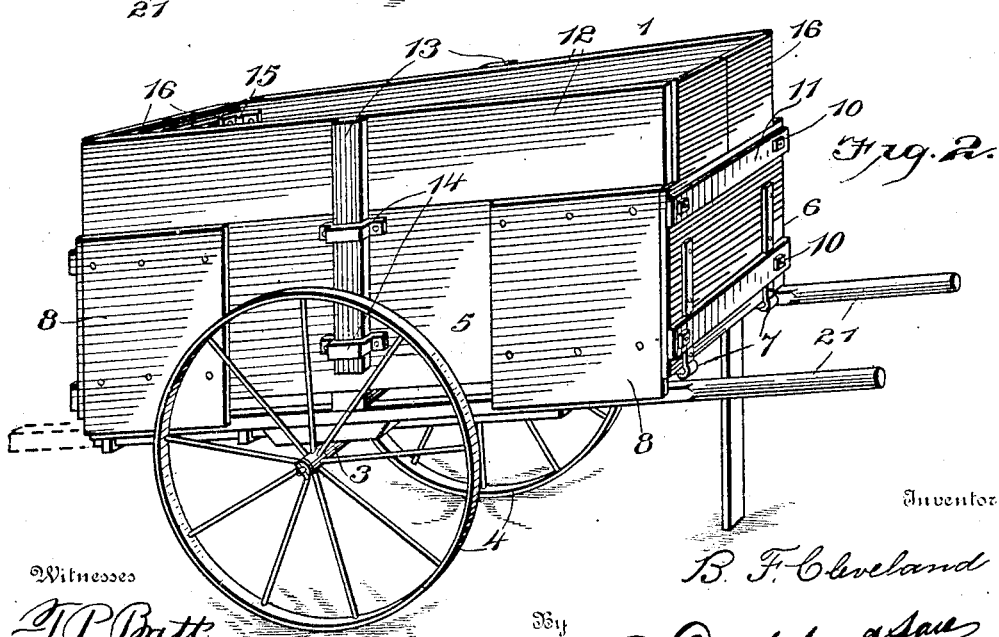

Referring to the accompanying drawing, Figure 1 is a perspective view of the device being employed as a hog chute, and Fig. 2 is a perspective view of the device being employed as a simple cart.

Like numerals of reference indicate the same parts throughout the several figures in which:—

1 indicates the combined cart and hog chute which comprises a bottom 2 suitably mounted on the axle 3 and wheels 4.

5 indicates the sides of the cart which are suitably secured to the bottom 2, and 6 indicates the end pieces. As shown in Fig. 2 the end pieces 6 are hinged to the bottom 2 at 7, and it will be seen that on each end piece 6 auxiliary pieces 8 are secured by means of two straps 9 (Fig. 1), the ends of which strap are passed through the end pieces 6 and rigidly secured by means of taps or nuts 10, the said end pieces being braced by suitable transverse pieces 11.

As shown, additional side pieces 12 may be secured to the sides 5 by means of uprights 13 passed through suitable straps 14 secured to the side pieces 5 in order to increase the height of the sides of the cart. Hinged to the additional side pieces 12 at 15 (Fig. 1) are auxiliary end pieces 16 and secured to the additional side pieces 12, as shown in Fig. 1, are fastening hooks 17 arranged to engage an eye 18 in the auxiliary end pieces 16; while in the side pieces 6 is arranged a hook 19 for the purpose of engaging an eye 20 secured in each end piece 6.

21 indicates the handles of the cart, which as shown in Fig. 2, perform the function of usual cart handles; while as shown in Fig. 1 they form a stop and bearing for the end pieces 6.

Having thus described the several parts of my invention its operation is as follows: In order to employ the device as a simple cart the end pieces 6 are carried up into position shown in Fig. 2 and secured by means of the hooks 19 and eyes 20, and for utilizing the additional side pieces 12 their auxiliary ends 16 are swung into position shown in Fig. 2 and secured by means of the hooks 17 and eyes 18. However, of course as is obvious, the additional side pieces 12 together with the auxiliary ends 16 may be removed from the cart by simply raising the standards 13 out of the straps 14 on the sides 5. When utilizing the device, however, as a hog chute the end pieces 6 are swung down into position shown in Fig. 1, the handles 21 resting on the ground or floor and supporting the end piece 6, holding the same parallel with the floor of the bottom 2. As said end pieces 6 are swung down into this position the auxiliary side pieces 8 being secured thereto are also thrown into position shown in Fig. 1, which operation materially lengthens the sides of the cart, the auxiliary side pieces 8 forming an addition to the sides 5 at both ends of the cart, and if it is desired to use the additional sides 12 the auxiliary ends 16 are swung out into position shown in Fig. 1 parallel with the additional sides 12, thereby increasing the sides of the cart at both ends thereof and increasing the depth of the cart or chute in such manner that a simple, strong and efficient hog chute is provided.

This device is particularly adapted to be used in removing hogs or the like from vehicles, carts, etc., and when used in this capacity one end thereof is set or placed upon the floor of the vehicle or cart which is indicated by A in Fig. 1, while the handles 21 rest upon the ground or floor. Of course the wheels 4 can be suitably chocked in order to prevent the movement of the device while the same is being utilized as a hog chute.

Having thus fully described my invention what I claim as new and desire to secure by Letters Patent of the United States is:—

1. In a device of the character described, the combination of the bottom and sides, of an end piece connected to said bottom at each end thereof, auxiliary sides secured to each of said end pieces and normally overlapping the said sides when the said end pieces are in a closed position, the whole arranged whereby said auxiliary sides form an addition to the said sides when the said end pieces are in an open position, substantially as described.

2. In a device of the character described, the combination of the bottom and sides, of an end piece hinged to the said bottom, auxiliary sides secured to said end piece at the side edges thereof and normally overlapping the said sides when the said end piece is in a closed position, the whole arranged whereby the said auxiliary sides form an addition to the said sides when the said end piece is in an open position, substantially as described.

3. In a device of the character described, the combination of the bottom and sides, of extending handles, an end piece hinged to the said bottom, auxiliary sides secured to said end piece, the whole arranged whereby the said end piece may be swung down on said handles causing the said auxiliary sides to form an addition to said sides, substantially as described.

4. In a device of the character described, the combination of the bottom and sides, of an end piece associated therewith, auxiliary sides secured to said end piece for making an addition to the said sides, additional sides removably secured to said sides, and an auxiliary end secured to said additional sides, substantially as described.

In testimony whereof, I affix my signature, in presence of two witnesses.

BENJAMIN FRANKLIN CLEVELAND.

Witnesses:
   PHIL SCHALLER,
   J. H. STALFORD.